Sept. 25, 1928.  A. S. NORTHRUP  1,685,241

INSECT TRAP

Filed July 7, 1926

Inventor
A. S. Northrup,

Witnesses:

Patented Sept. 25, 1928.

1,685,241

UNITED STATES PATENT OFFICE.

ANNABELLE S. NORTHRUP, OF NORFOLK, VIRGINIA.

INSECT TRAP.

Application filed July 7, 1926. Serial No. 121,022.

This invention relates to improvements in insect traps, and more particularly to a trap comprising a bait holding frame and a detachable spaced outer carrying casing.

An object of the invention is to provide an improved insect trap which will be so constructed that a maximum area may be utilized for holding the bait which may be renewed or replaced when necessary.

A further object of the invention is to provide an insect trap adapted to hold a quantity of bait, and to further provide a spaced housing or carrying casing which will surround the bait carrying portion of the trap to protect the same.

A still further object of the invention is to provide an insect trap casing with suitable supporting means for positioning a removable bait holding frame within the casing, and a door which will automatically clamp said frame in fixed position when closed.

Other objects will appear as the description proceeds.

In the accompanying drawings which form a part or my application,

Like characters of reference are used throughout the following specification and the accompanying drawings to designate corresponding parts.

Figure 1:
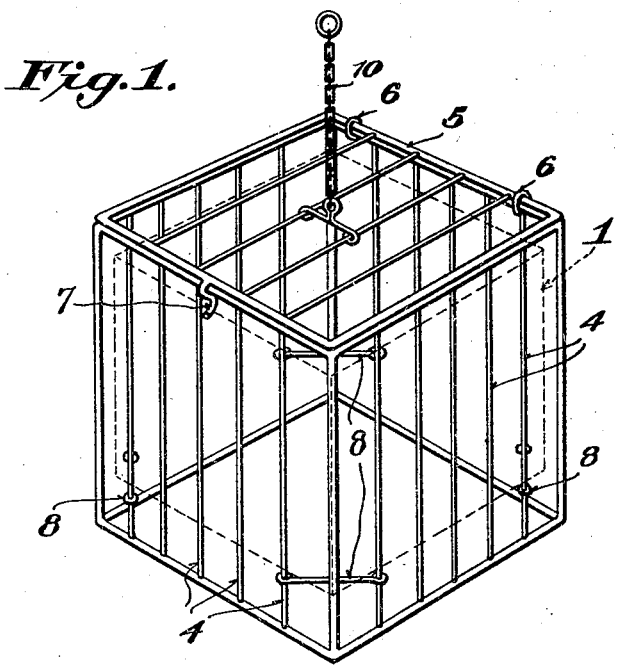
Figure 1 is a perspective view of the outer insect trap casing.
Figure 2:
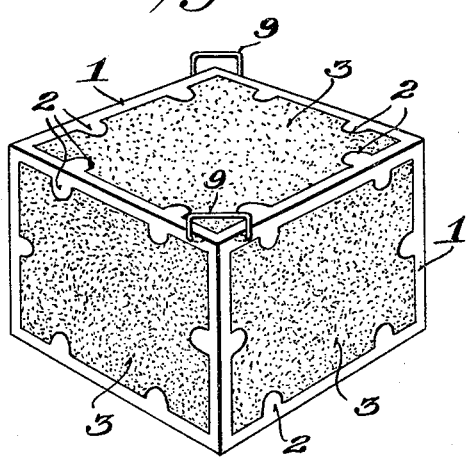
Figure 2 is a perspective view of the bait holding frame, showing the bait in position thereon.

My improved bait holding frame is preferably formed in the shape of a cube and is composed of metal strips 1 soldered together thereby providing a substantially rigid construction. The strips 1 are approximately one half inch across, although their size or width may vary depending upon the size of the trap.

Each strip is provided with one or more clips 2 which are formed by bending a piece of metal upon itself. The sheets 3 containing the insect bait are clipped in the four sides and in the top of the frame, and are spaced at their edges approximately a half inch from the adjacent side and top strips 1.

The bait sheets 3 are made from any desired material, and are impregnated with the bait which is of a sticky character and has insect attracting properties, so that when the insects alight on the sheets they will adhere thereto.

It will readily be seen that any one, or all of the sheets of bait may be removed from the frame, and new ones substituted when necessary.

My preferred form of outer casing 4 is also in the shape of a cube and comprises four sides and a hinged top formed of wires spaced about a half inch apart. The top 5 is hinged at 6 and is provided with a suitable snap fastener 7 for holding the same securely closed. Supporting bars 8 extend across the corners of the casing about an inch from the bottom thereof, and are adapted to support the bait holding frame, when the same is housed within the said casing 4. Substantially rigid handle members 9 are disposed at opposite corners of the bait holding frame, and are adapted to be engaged by the under surface of the top of the casing 4, when in closed position.

A suitable supporting chain 10 will be attached to the casing 4 to hold the same suspended when desired. The bait holding frame will be spaced approximately one inch from the side walls and top of the casing 4, when it is enclosed therein.

Figure 3:
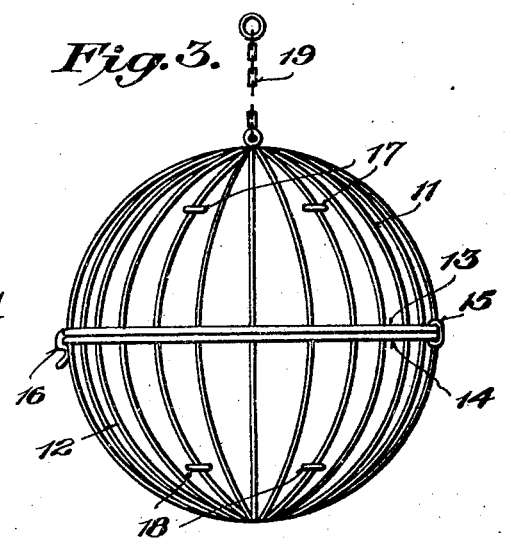
Figure 3 is a side elevation of a modified form of insect trap casing.

A modified form of casing is illustrated in Figure 3 of the drawings, and is composed of the sections 11 and 12, of spaced wires which have their adjacent edges bound by the metal bands 13 and 14. The sections are hinged together at 15 and have a suitable fastener 16 for holding the same together. Spaced supporting wires 17 and 18 are positioned near the apex of each of the sections 11 and 12 for supporting a bait holding frame within the casing. A chain 19 is attached to the casing whereby the same may be suspended.

I do not intend to limit myself to the specific construction described and illustrated herewith, as many minor changes in detail of construction may be resorted to without departure from the spirit of the invention.

I claim:—

1. An insect trap comprising a guard body consisting of a plurality of spaced wires, horizontally disposed members carried by certain of said spaced wires, a removable bait carrier including a frame and bait-carrying side walls arranged to form a cube and the corners of the frame of said bait carrier being adapted to rest on the horizontal supporting members thereby to expose all sides of the bait carrier.

2. An insect trap comprising a cube-like guard body including a plurality of vertical guard wires, horizontal supporting members arranged obliquely at the inside corners of said guard member, and a cube-like bait carrying member adapted to rest on said horizontal supporting members thereby to expose the bait carrier on all sides.

In testimony whereof I hereunto affix my signature.

ANNABELLE S. NORTHRUP.